(12) United States Patent
Chieu et al.

(10) Patent No.: US 9,052,940 B2
(45) Date of Patent: Jun. 9, 2015

(54) SYSTEM FOR CUSTOMIZED VIRTUAL MACHINE FOR A TARGET HYPERVISOR BY COPYING IMAGE FILE FROM A LIBRARY, AND INCREASE FILE AND PARTITION SIZE PRIOR TO BOOTING

(75) Inventors: Trieu C. Chieu, Yorktown Heights, NY (US); David Cohn, Yorktown Heights, NY (US); Ajay Mohindra, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 528 days.

(21) Appl. No.: 13/409,945

(22) Filed: Mar. 1, 2012

(65) Prior Publication Data

US 2013/0232484 A1    Sep. 5, 2013

(51) Int. Cl.
   *G06F 9/455*    (2006.01)
(52) U.S. Cl.
   CPC .. *G06F 9/45558* (2013.01); *G06F 2009/45575* (2013.01)
(58) Field of Classification Search
   CPC .................. G06F 9/45558; G06F 2009/45575; G06F 9/45533; G06F 9/45554; G06F 8/63
   See application file for complete search history.

(56) References Cited

U.S. PATENT DOCUMENTS

| | | | | |
|---|---|---|---|---|
| 7,246,200 | B1* | 7/2007 | van Rietschote et al. | 711/114 |
| 7,640,409 | B1* | 12/2009 | Stafford et al. | 711/162 |
| 8,418,176 | B1* | 4/2013 | Keagy et al. | 718/1 |
| 2012/0191929 | A1* | 7/2012 | Zietzke et al. | 711/162 |

OTHER PUBLICATIONS

VMware VCenter Converter Standalone (User'S Guide), VCenter Converter Standalone 5.0, pp. 1-96, Sep. 1, 2011.
ATL: Atlas Transformation Language, Specification of the ATL Virtual Machine, Version 0.1, 2005, pp. 1-62, Dec. 2005.
Report on the Prior User Rights Defense, Report to Congress, Jan. 2012, pp. 1-60.

* cited by examiner

*Primary Examiner* — Abdullah Al Kawsar
*Assistant Examiner* — Wissam Rashid
(74) *Attorney, Agent, or Firm* — F. Chau & Associates, LLC

(57) ABSTRACT

A method for customizing virtual machines includes retrieving a virtual machine image file from a library of virtual machine image files. A target virtual machine image file is created by making a copy of the retrieved virtual machine image file. A file size of the target virtual machine image file is increased. A partition size of a primary partition of the target virtual machine image file is increases. The target virtual machine image file is booted after the partition size of the primary partition thereof has been increased.

6 Claims, 4 Drawing Sheets

SYSTEM FOR CUSTOMIZED VIRTUAL MACHINE FOR A TARGET HYPERVISOR BY COPYING IMAGE FILE FROM A LIBRARY, AND INCREASE FILE AND PARTITION SIZE PRIOR TO BOOTING

TECHNICAL FIELD

The present disclosure relates to virtual appliances and, more specifically, to a policy-based approach to provisioning and transforming virtual appliances.

DISCUSSION OF THE RELATED ART

A virtual machine (VM) is a construct by which one or more independent operating systems may be executed on a host computer over a host operating system such that the hardware resources of the host computer are not directly made available to the one or more independent operating systems. Each of the one or more "virtual" operating systems may operate as if it is in direct communication to physical hardware when in reality, an illusion of physical hardware is provided by software running on the host computer. In this way, the software running on the host computer manages interaction between each of the virtual operating systems and the actual hardware so that the resources of the hardware may be effectively allocated between one or more virtual operating systems, each of which may function with complete separation from one another.

The software running on the host computer for managing the one or more virtual operating system is known as a hypervisor. The virtual operating system may be stored as one or more files on the host computer and these files may be readable by the hypervisor. The virtual operating system may, when not in use by the hypervisor, remain as dormant files. When use is desired, the operating system may be virtually booted up by the hypervisor from the one or more files.

There are multiple different types of hypervisor technologies currently available and many hypervisors cannot interpret the virtual operating system files of a different hypervisor. Moreover, the virtual system files may be created from image files rather than from installing an operating system into a virtual environment from scratch. However, in order to quickly and easily deliver customized virtual operating systems, a large catalogue of image files would have to be maintained to represent all of the various permutations and hypervisors that users may desire. This catalogue of images may be expensive and difficult to create and maintain.

SUMMARY

A method for customizing virtual machines includes retrieving a virtual machine image file from a library of virtual machine image files. A target virtual machine image file is created by making a copy of the retrieved virtual machine image file. A file size of the target virtual machine image file is increased. A partition size of a primary partition of the target virtual machine image file is increases. The target virtual machine image file is booted after the partition size of the primary partition thereof has been increased.

The library of virtual machine image files may be a library of virtual appliance image files and the target virtual machine image file may be a target virtual appliance image file. The partition size of the primary partition of the target virtual machine image file may be increased without booting the target virtual machine.

The target virtual machine image file may be mounted to a computer system as a virtual drive when increasing the file size of the target virtual machine image file and increasing the partition size of the primary partition of the target virtual machine image file.

A file system of the target virtual machine image file may be checked after increasing the partition size of a primary partition of the target virtual machine image file and the target virtual machine image file may be repaired when the check reveals one or more errors in the file system of the target virtual machine image file.

The file system of the target virtual machine image file may be enlarged after increasing the partition size of a primary partition of the target virtual machine image file.

One or more additional provisioning steps may be performed on the target virtual machine image file after booting the target virtual machine image file.

A method for customizing virtual machines includes retrieving a virtual machine image file from a library of virtual machine image files, the retrieved virtual machine image file being configured to execute on a hypervisor of a first type. A target virtual machine image file is created by building a new virtual machine image file configured to execute on a hypervisor of a second type that is different than the first type. The contents of the retrieved virtual machine image file are copied to the created target virtual machine image file. The target virtual machine image file is booted after the contents of the retrieved virtual machine image file have been copied thereto.

The copying of the contents of the retrieved virtual machine image file to the created target virtual machine image file may include copying all contents of the retrieved virtual machine image file except for a boot directory thereof to the created target virtual machine image file.

File attributes may be preserved when copying the contents of the retrieved virtual machine image file to the created target virtual machine image file.

Both the retrieved virtual machine image file and the created target virtual machine image file may be mounted to a computer system as a virtual drive when copying the contents of the retrieved virtual machine image file to the created target virtual machine image file.

The retrieved virtual machine image file may be un-mounted from the computer system after copying the contents of the retrieved virtual machine image file to the created target virtual machine image file. The target virtual machine image file may be un-mounted from the computer system prior to booting the target virtual machine image file.

Hypervisor specific dependencies may be managed after copying the contents of the retrieved virtual machine image file to the created target virtual machine image file.

The library of virtual machine image files may be a library of virtual appliance image files and the target virtual machine image file may be a target virtual appliance image file.

A system for customizing virtual machines includes a user portal for receiving a request for a particular virtual appliance. One or more provisioning managers select a virtual appliance image file from a library of virtual appliance image files, generate a target virtual appliance image file from the selected virtual appliance image file, and configure the target virtual appliance image file prior to booting the target virtual appliance image file. One or more policy managers maintain policies for determining how the one or more provisioning managers configure the target virtual appliance image file. A resource manager selects available hardware resources for booting the provisioned target virtual appliance image file.

The user portal may include a website accessible to a user over the Internet using a web browser. Generating the target virtual appliance image file from the selected virtual appliance image file may include creating the target virtual appliance image file by making a copy of the selected virtual appliance image file, increasing a file size of the target virtual appliance image file, and increasing a partition size of a primary partition of the target virtual appliance image file.

The partition size of the primary partition of the target virtual appliance image file may be increased without booting the target virtual appliance image file. Generating the target virtual appliance image file from the selected virtual appliance image file may include creating the target virtual appliance image file by building a new virtual appliance image file configured to execute on a hypervisor of a type that is different than a type of hypervisor type that the selected virtual appliance image file is configured to execute on and copying contents of the selected virtual appliance image file to the created target virtual appliance image file. The copying of the contents of the selected virtual appliance image file to the created target virtual appliance image file may include copying all contends of the selected virtual appliance image file except for a boot directory thereof to the created target virtual appliance image file.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
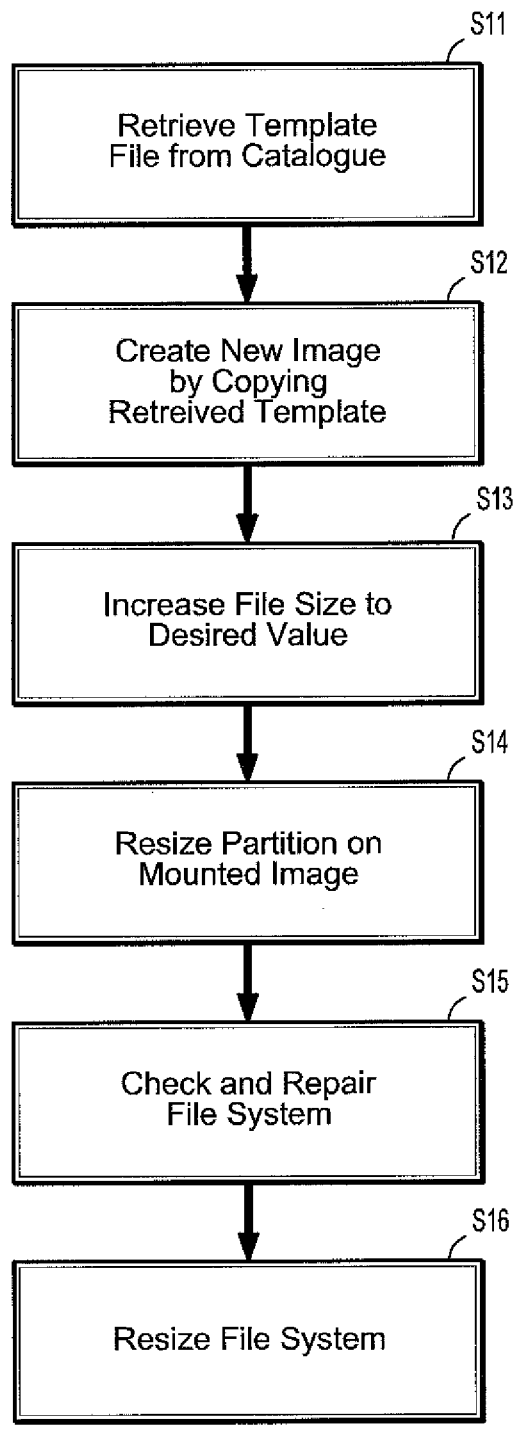
FIG. 1 is a flow chart illustrating a method for provisioning virtual environments according to exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide approaches for customizing virtual machine image files without the need to boot up the virtual machine so that a reduced catalogue of virtual machine image files may be maintained and later customized upon demand. As used herein, the term "virtual appliance" is understood to mean a virtual machine preloaded with application software, and accordingly, exemplary embodiments of the present invention may similarly provide approaches for customizing virtual appliance image files.

As discussed above, a provider may maintain a catalogue of virtual machine/appliance images ("virtual images"). Each of the virtual images may be pre-built for a particular hypervisor and may have pre-determined characteristics such as storage disk size, a particular configuration of network adapters, and particular user profiles. Each virtual image may include two files: a configuration file and an actual disk image. The configuration file may include metadata about location of the disk file, display name, attached network and peripheral devices, and information about other hardware elements that are to be virtualized in executing the virtual image.

The provider may choose to maintain a larger catalogue of virtual images to more quickly and easily provide a desired virtual machine or virtual appliance ("virtual environment") or the provider may choose to maintain a smaller catalogue of virtual images with fewer permutations. Where the provider chooses to maintain the larger catalogue, there may be significant costs associated with creating and maintaining the catalogue. However, where the provider chooses to maintain the smaller catalogue, the virtual environment delivered to a user may not be exactly what is desired and/or significant customization may have to be performed upon booting up the virtual environment for the first time.

Exemplary embodiments of the present invention provide approaches for quickly and easily customizing (provisioning) virtual environments from virtual environment images so that a reduced catalogue of virtual environment images may be maintained and yet highly specialized virtual environments may be quickly and easily delivered for the benefit of a user.

As used herein, provisioning may refer to the creation of a virtual appliance instance from a given image template, with capabilities such as assigning new host names, IP addresses, increasing disk size, change to the configuration of network adapters, and/or customization of user profiles, etc.

Provisioning, according to exemplary embodiments of the present invention, may be able to change certain attributes of the virtual environment by directly manipulating the virtual environment image files without the need from booting up a particular virtual environment.

Exemplary embodiments of the present invention may also be able to transform a given virtual appliance, such as a template file, from compatibility with an original hypervisor to compatibility with a new hypervisor that is different from the original hypervisor. Accordingly, such changes may be referred to herein as transformations.

FIG. 1 is a flow chart illustrating a method for provisioning virtual environments according to exemplary embodiments of the present invention. First, a virtual environment template file may be selected and retrieved from a catalogue of template files (Step S11). The virtual environment template files may be virtual environment images of various virtual environments. The virtual environment template file may be selected from within the catalogue based on one or more desired attributes. However, the selected template may still deviate from a set of desired attributes in one or more ways.

Next, a new virtual environment image file may be created by copying the selected virtual environment template file (Step S12). Where it is desired that the new virtual environment image file be of the same hypervisor as the virtual environment template file, the copying of the selected virtual environment template file may be performed by making an exact duplication of the template file into a new file.

Figure 2:
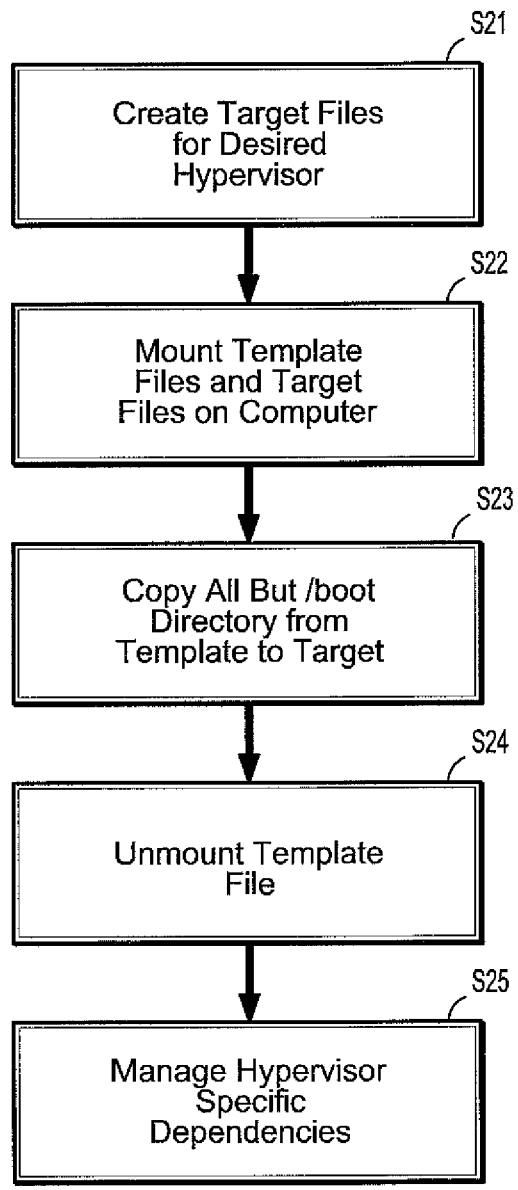
FIG. 2 is a flow chart illustrating an approach for copying the template file into a new virtual environment image file of a different hypervisor according to exemplary embodiments of the present invention.

Where, however, it is desired that the new virtual environment image file be of a different virtual environment than that of the template file, exemplary embodiments of the present invention provide an approach for copying the template file into a new virtual environment image file suitable for a different hypervisor. FIG. 2 is a flow chart illustrating an approach for copying the template file into a new virtual environment image file of a different hypervisor according to exemplary embodiments of the present invention. First, a new virtual environment image file may be generated on the target hypervisor (Step S21). Examples of suitable hypervisors that may be used include KVM appliance, Xen appliance, and VMware appliance. The new virtual environment image file may be generated to have a similar operating system and disk size as that of the template file. Next, raw image files of the template as well as the raw image files of the new virtual environment may be mounted on a common computer (Step S22). Mounting of the raw image files may be performed without actually booting up either image file. The mounting of these image files may be performed, for example, using loop devices to mount the root partition of the raw image, for example, using '/scr' and/or 'dest' commands.

Next, a file copy may be performed to copy the entire contents of the template file, with the exception of the "/boot" directory, to the new virtual environment image file (Step S23). The copy may be performed so as to preserve file attributes such as ownership and timestamps from the original template. For example, the copy may be performed as "# cp–ax/scr/{root, bin, . . . etc.}/dest)". Thereafter, each of the template files may be unmounted (Step S24). However, where additional customization of the new virtual image is desired, unmounting of the new image file may be postponed. Where necessary, hypervisor specific dependencies may be managed so that the new image file may be a fully-functioning virtual environment image able to be executed using the desired hypervisor (Step S25).

In either event, after the copy operation has been performed in Step S12, where it is desired that the storage size of the new virtual environment be altered from that of the template file, the file size of the new virtual image file may be increased to a desired value (Step S13). In performing this step, the file size may be increased, for example, by appending the file with zeros, ones, or some pattern thereof that does not have particular significance. For example, the 'dd' Linux utility may be used to add and fill additional zeros 'dev/xero/' to the new image file.

Next, a partition utility may be used on the new image file to perform resizing of the existing primary disk partition of the virtual image (Step S14). For example, the 'fdisk' or 'parted' utilities may be used. It should be noted that this resizing of the primary disk partition may be performed without booting up the new virtual image file as a virtual environment; rather, the repartitioning of the primary disk partition of the virtual image may be performed on the mounted new virtual image file.

Thereafter, a file system check may be performed on the primary disk partition of the virtual image (Step S15). For example, an 'e2fsck' utility may be used to check and repair the file system. File system resizing may also be performed on the loop-device mounted virtual image (Step S16). For example, a 'resize2fs' utility may be used to resize the file system to a desirable block size. An optional verification step may then be performed in which the newly expanded virtual image is booted to check disk (Step S17).

Figure 3:
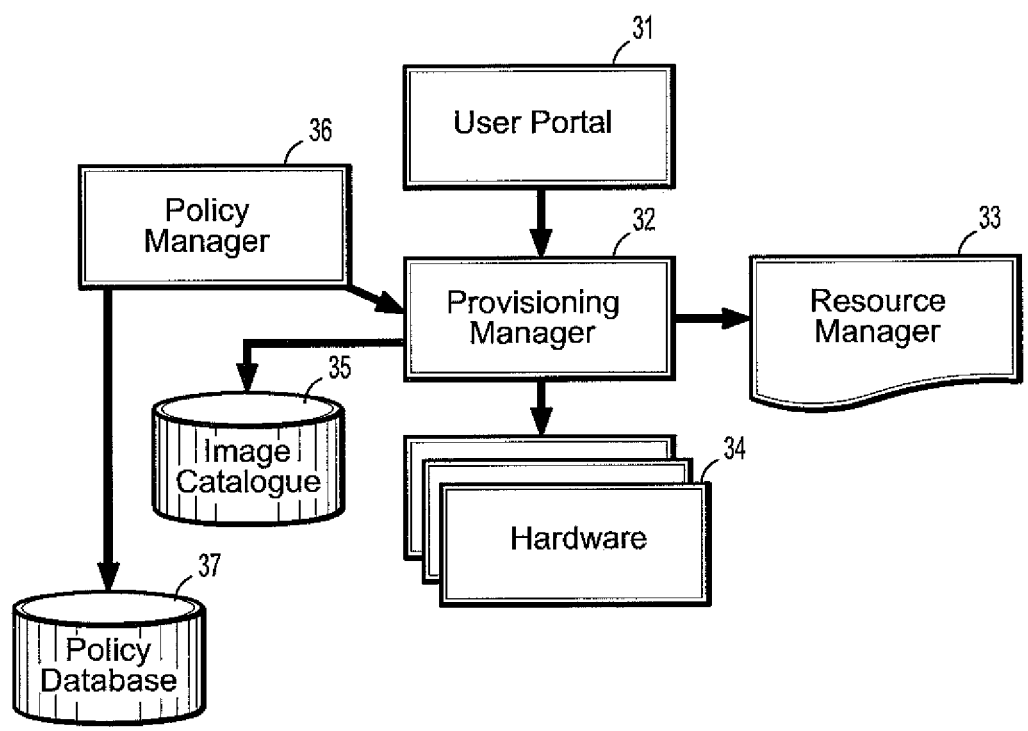
FIG. 3 is a block diagram illustrating a system for provisioning virtual environments according to exemplary embodiments of the present invention.

FIG. 3 is a block diagram illustrating a system for provisioning virtual environments according to exemplary embodiments of the present invention. The system so illustrated may be used, for example, by a provider of cloud-based computing services whose customers desire specialized solutions that may be embodied as virtual appliances. The customer may access the services of the provider via a user portal 31. The user portal may be, for example, embodied as a website accessible to the customers over the Internet using a browser. The customer may provide specifications for a desired virtual appliance through the user portal 31 or the customer may otherwise select a desired product from among a list of available products and the selected product may have specifications for a virtual appliance associated with it.

Thereafter, one or more provisioning managers 32 may locate and retrieve an appropriate image from a catalogue or library of images 35. The image catalogue 35 may include a limited subset of images as compared to the full list of available products made available to the customer. For example, the image catalogue 35 may include images having a limited number of disk sizes, designed for a limited number of hypervisors, having a limited number of network adapters, having a limited selection of user profiles, etc. Accordingly, the image retrieved from the image catalogue 35 may require customization before the desired virtual appliance may be created.

The provisioning manager 32 may then proceed to customize the image retrieved from the image catalogue 35 without actually booting the virtual appliance image. The Policy Manager 36 may maintain policies that determine how the provisioning manager 32 should configure the images before provisioning. The Policy Manager 36 may use the policy database 37 to make the determination based on the policies associated with images in the catalog. For example, a policy may state that all instances derived from the RedHat images requested by users in the Accounting department should have the second network adapter be disabled, while another policy may state that all instances based on the RedHat images requested by the users in the Testing team should have the second network adapter enabled and configured to 1 Gbps speeds. The policy manager provides a framework to customize individual images based on an organization's policies. The provisioning manager transforms the virtual images based on the policies stated by the Policy Manager. This transformation may be performed, for example, in the manner discussed above with reference to FIGS. 1 and 2.

The provisioning manager 32 may thereafter consult with a resource manager 33. The resource manager may allocate available hardware 34 necessary to host the virtual appliance. The provisioning manager 32 may then boot the customized virtual appliance to the hardware 34 allocated by the resource manager 33. Upon initially booting the virtual appliance, the provisioning manager 32 may perform additional provisioning steps, where needed. In this way, a desired virtual appliance may be provisioned and hosted without having to create and maintain a large library of virtual appliance images.

As discussed above, exemplary embodiments of the present invention may be used to provision virtual appliances by performing off-line configuration of Hostname and Network adaptor in an image file. Such provisioning may be performed, for example, by performing the following steps:

First, the boot partition of image file may be mounted at a mount point /mnt in file system (for example, with command #mount –o loop,offset=32256 ${imgName}/mnt). Next, the HOSTNAME file may be edited and modified at /mnt/etc/HOSTNAME with new $Hostname. Then $Hostname alias, $Hostname, $IPAddr may be modified and added in hosts file at /mnt/etc/hosts. Network files may then be created or modified. Creation or modification of the network files may include creating or modifying /mnt/etc/sysconfig/network-scripts/ifcfg-eth0 with DEVICE=eth0", BOOTPROTO=static, IPADDR=$IPAddr, NETMASK=$NetMask, Type=Ethernet, and/or ONBOOT=yes. The network files at /mnt/etc/sysconfig/network may be created or modified with NETWORKING=yes, NETWORKING_JPV6=no, HOSTNAME=$Hostname, and/or GATEWAY=$Gateway. The network files resolv.conf file at /mnt/etc/resolv.conf may be created or modified with nameserver $DNS, and/or search $Domain.

After the creation/modification of the network files, the image may be unmounted, for example, with command #unmount /mnt.

Figure 4:
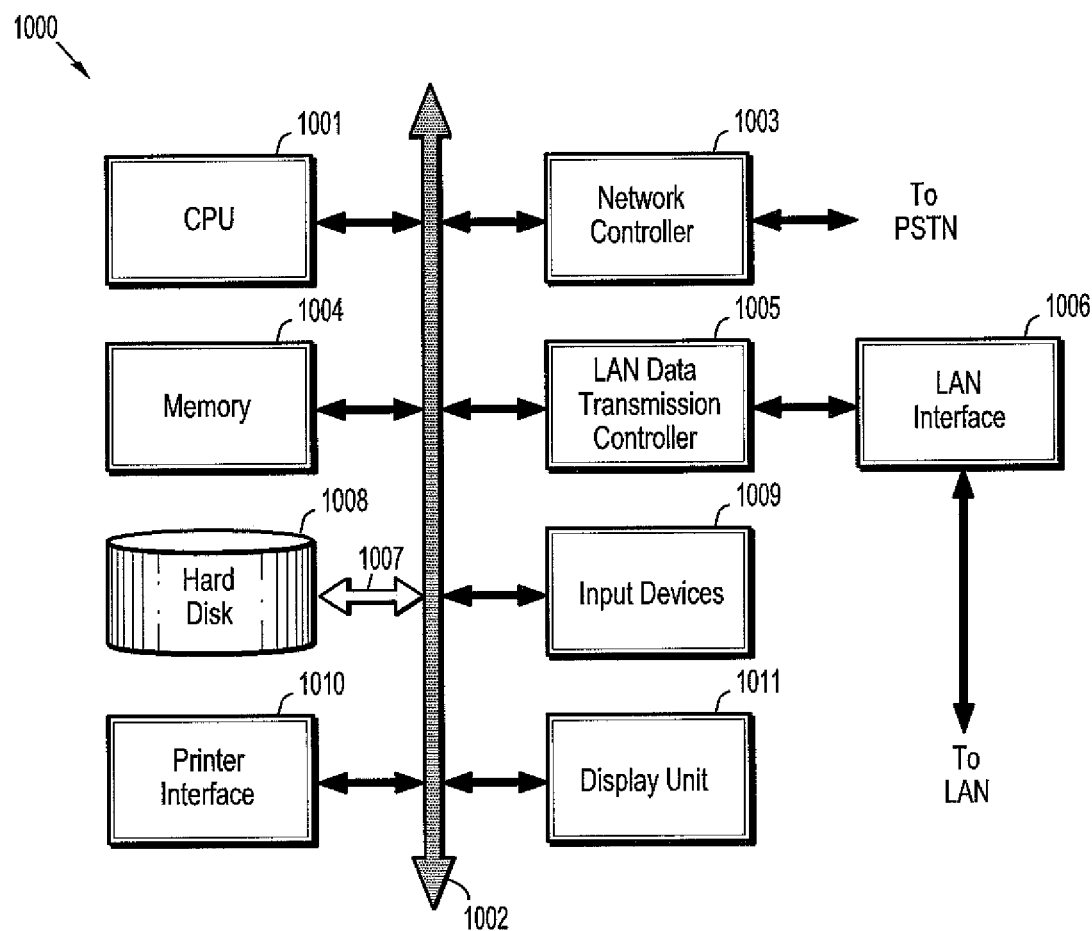
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for customizing virtual machines, comprising:
    retrieving a virtual machine image file from a library of virtual machine image files, the retrieved virtual machine image file being configured to execute on a hypervisor of a first type;
    creating a target virtual machine image file by building a new virtual machine image file configured to execute on a hypervisor of a second type that is different than the first type, wherein creating the target virtual machine image file further comprises:
        mounting both the retrieved virtual machine image file and the created target virtual machine image file as a virtual drive in a common computing system;
        copying contents of the retrieved virtual machine image file, except for a boot directory thereof, to the created target virtual machine image file and un-mounting the retrieved virtual machine image file after the copying; and
        increasing a file size of the target virtual machine image file;
        increasing a partition size of a primary partition of the target virtual machine image file, wherein a file system of the target virtual machine image file is checked for one or more errors after the increasing of the partition size and the target virtual machine image file is repaired when the one or more errors are revealed by the check;
    un-mounting the target virtual machine image file;
    booting the target virtual machine image file after the un-mounting; and
    performing one or more provisioning steps on the target virtual machine image file after the booting.

2. The method of claim 1, wherein the library of virtual machine image files is a library of virtual appliance image files and the target virtual machine image file is a target virtual appliance image file.

3. The method of claim 1, wherein file attributes are preserved when copying the contents of the retrieved virtual machine image file to the created target virtual machine image file.

4. The method of claim 1, wherein hypervisor specific dependencies are managed after copying the contents of the retrieved virtual machine image file to the created target virtual machine image file.

5. A system for customizing virtual machines, comprising:
    a user portal, including a computer system having a processor, a memory device and a storage space, for receiving a request for a particular virtual appliance;
    one or more provisioning managers, including a computer system having a processor, a memory device and a storage space, for:
        selecting a virtual appliance image file from a library of virtual appliance image files, the selected virtual appliance image file being configured to execute on a hypervisor of a first type;
        generating a target virtual appliance image file from the selected virtual appliance image file by building a new virtual appliance image file configured to execute on a hypervisor of a second type that is different than the first type; and
        mounting both the selected virtual appliance image file and the generated target virtual appliance image file as a virtual drive in a common computing system;
        copying contents of the selected virtual appliance image file, except for a boot directory thereof, to the generated target virtual appliance image file; and
        increasing a file size of the generated virtual appliance image file;
        increasing a partition size of a primary partition of the generated virtual appliance image file, wherein a file system of the generated virtual appliance image file is checked for one or more errors after the increasing of the partition size and the generated virtual appliance image file is repaired when the one or more errors are revealed by the check;
        un-mounting the generated virtual appliance image file;
    one or more policy managers, including a computer system having a processor, a memory device and a storage space, for maintaining policies for determining how the one or more provisioning managers configure the target virtual appliance image file; and
    a resource manager, including a computer system having a processor, a memory device and a storage space, for selecting available hardware resources for booting the target virtual appliance image file by the one or more provisioning managers after the un-mounting; and
    the one or more provisioning managers performing one or more provisioning steps on the target virtual appliance image file after the booting.

6. The system of claim 5, wherein the user portal includes a website accessible to a user over the Internet using a web browser.

* * * * *